June 7, 1955     O. J. MENGALI     2,710,375
RESISTOR TESTING DEVICE

Filed May 20, 1950     2 Sheets-Sheet 2

INVENTOR.
Otavio J. Mengali
BY Adams, Stevens & Mase

AGENTS.

United States Patent Office 2,710,375
Patented June 7, 1955

2,710,375

RESISTOR TESTING DEVICE

Otavio J. Mengali, Columbus, Ohio, assignor, by mesne assignments, to The Battelle Development Corporation, Columbus, Ohio, a corporation of Delaware Application May 20, 1950, Serial No. 163,177

2 Claims. (Cl. 324—62)

This invention relates to the measurement of resistances, and, more particularly, to the measurement of resistances over a very wide range, for example from 10 ohms to 5 megohms.

In research laboratories, commercial testing laboratories, and in manufacturing control operations, there is often a need for the measurement of resistances over a wide range, under load, and under various external conditions.

Therefore, one object of this invention is to provide means whereby the resistance of a single resistor or of a plurality of resistors may be measured, at intervals over a period of time, while under load, and while the resistors are being subjected to various external conditions.

It is another object of this invention to provide a novel circuit and switching arrangement, whereby such measurements may be obtained with a minimum expenditure of time and with minimum expense.

It is a further object of this invention to provide a novel means for supporting a single resistor, or a plurality of resistors, whereby such resistor, or resistors, may be subjected to a variety of external conditions, while under load, and while the resistance thereof is being measured.

Figure 1:
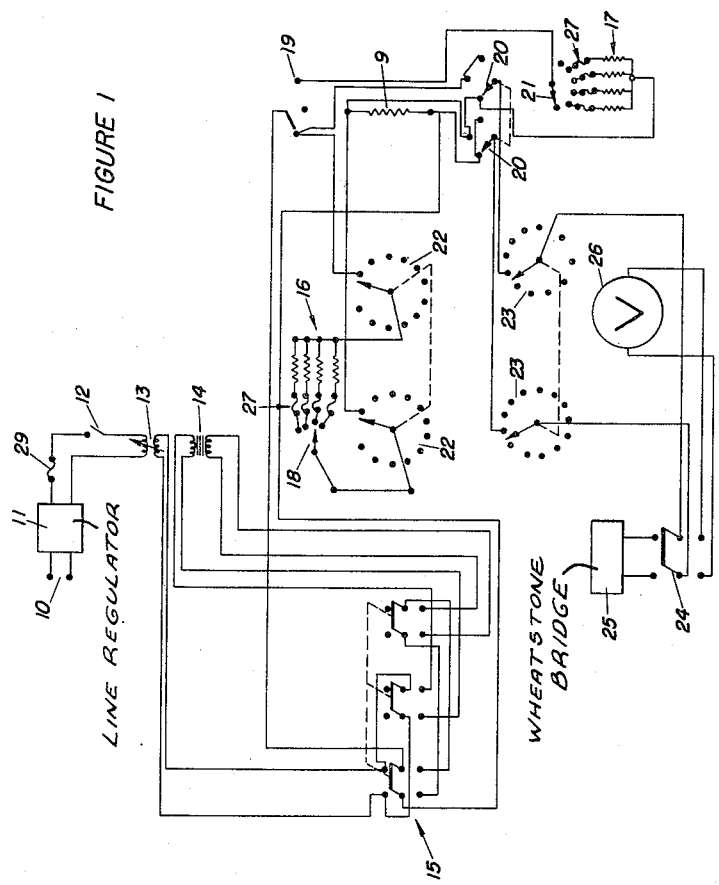
Figure 2:
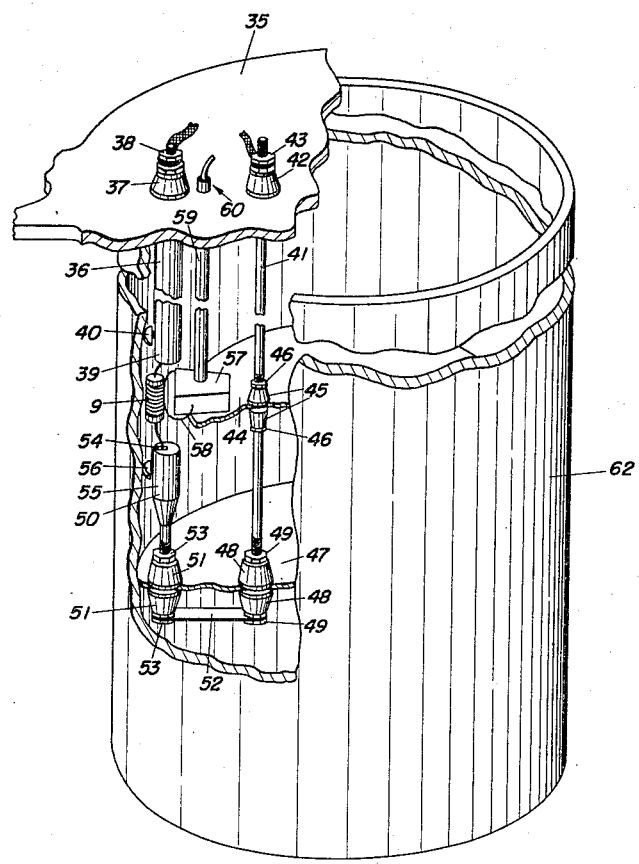

Various additional objects and advantages of this invention will become apparent to those skilled in the art upon reading the following description, taken in conjunction with the accompanying drawings, in which:

Fig. 1 is a wiring diagram of the novel circuit employed in effecting such measurements; and Fig. 2 is a perspective view, partly in section, of the supporting means whereby a resistor, or a plurality of resistors, may be subjected to various external conditions, while under load, and whereby they may have their resistance measured.

Referring more particularly to Fig. 1, 10 is a source of current (preferably 110 volts, 60 cycle), 11 is a line regulator, and 12 is an on-off switch.

In this wiring diagram conventional symbols have been used. Moreover, it is to be understood that a circuit for a single resistor 9 under test has been shown. In order to test a multiplicity of resistors, a duplicate circuit, incorporating some of the elements shown herein, is needed for each resistor which is to be tested.

A separate variable transformer 13 and step-up transformer 14 are provided for each resistor to be tested. Three double-pole, double-throw switches, ganged together, indicated generally at 15, are also provided for each resistor to be tested. As will be apparent from the wiring diagram, the variable transformer 13 and the step-up transformer 14 are so connected to these switches, the source of current, and the resistor under test, that either the variable transformer alone, or the variable transformer and the step-up transformer, can be selected to provide a desired voltage.

Standard resistances of 1, 10, 100, and 1,000 ohms are indicated generally at 16. The particular resistance desired may be selected by means of radial switch 18. It is only necessary to provide a single set of these resistances, no matter how many resistors are to be tested. Compensating precision resistances of 1, 10, 100 and 1,000 ohms, indicated generally at 17, are provided for each resistor which is to be tested, and the particular compensating precision resistance desired in the circuit may be selected by means of radial switch 21. A single-pole, double-throw switch 19, having a center "off" or "open" position, is provided for each resistor to be tested. The purpose of this switch is to enable either the standard resistance or the compensating precision resistance to be placed in series with the resistor 9 under test; and also, when the switch is open, it will prevent the flow of any current while a static measurement of resistance is being made of resistor 9.

Switches 20—20, ganged together, are provided as shown. The purpose of these switches is to enable volt meter leads to be placed across either the resistor under test, the standard resistance, or both the standard resistance and the resistor under test. A set of these switches is provided for each resistor being tested.

One set of two, twelve contact, circular switches 22—22, ganged together is provided. One peripheral contact on these switches is connected to the resistor under test, the upper contact of left-hand switch 20, and the left-hand contact of right-hand switch 20, while the corresponding peripheral contact is connected to the upper and right-hand contacts of right-hand switch 20. The center rotatable contacts of these two switches are connected to the standard resistances. A single set of two, twelve contact, circular switches 23—23, ganged together, is also provided. Each pair of corresponding peripheral contacts on these switches is connected to the movable portions of switches 20—20. The center rotatable contacts of switches 23—23 are connected to the center contacts of a double-pole, double-throw switch 24. Connected to the upper contacts of switch 24 is a Wheatstone bridge 25, while connected to the lower contacts of switch 24 is an extremely accurate volt meter 26. A Ballantine vacuum tube volt meter is satisfactory for such use.

Each of the standard resistances indicated at 16, and each of the compensating precision resistances indicated at 17, are protected with 1 ampere fuses indicated generally at 27—27. The entire system is protected by a 1½ ampere fuse 29.

It will be apparent that a single set of switches 22—22, a single set of switches 23—23, switch 24, Wheatstone bridge 25, volt meter 26, and a single set of standard resistances indicated at 16 are all that are needed, in addition to each separate test resistor circuit, in order to test a plurality of resistors. As shown, a maximum of 12 resistors may be tested. Of course, by having a greater number of contacts on the two sets of circular switches, a correspondingly greater number of resistors may be tested. The circuit needed for each resistor to be tested comprises a variable transformer 13, a step-up transformer 14, a set of double-pole, double-throw switches indicated generally at 15, a single-pole, double-throw switch 19, a set of two switches 20—20, a switch 21, a set of compensating precision resistances indicated at 17, and proper connecting wires and fuses, as shown and described.

Referring now more particularly to Fig. 2, 35 is a support plate, which is preferably made of a material having a high resistance to corrosion, such as stainless steel. Due to the fact that the resistors under test are frequently subjected to injurious atmospheres and other deleterious external conditions, it is desirable to have the portions of the device shown in Fig. 2, where possible, made of a corrosion-resistant material. Attached to, and supported by plate 35, are the various elements which support the resistors being tested and the thermocouples which are used to measure the skin temperature of the individual resistors.

Member 36 is a cylindrical rod, also preferably made from a material such as stainless steel, insulated from plate 35 by insulator 37, but supported by plate 35 and said insulator by means of nut 38 which threadedly engages the upper end of member 36. Member 36 has a slotted lower end 39 adapted threadedly to engage screw 40. Columnar member 41 is similarly insulated from plate 35 by insulator 42, but supported by that plate and said insulator by means of nut 43, which threadedly engages the upper end thereof. Member 41 is likewise insulated from plate 44 by insulators 45—45. It will be apparent that member 41 acts as a support for plate 44 by means of nuts 46—46 which threadedly engage member 41. Member 41 extends through plate 44 and also extends through plate 47 and is insulated therefrom by insulators 48—48. Rod 41 functions to support plate 47, by means of nuts 49—49 which threadedly engage the rod. Rod 41 also functions to conduct electrical current. The lower resistance support member 50 is supported by plate 47 and extends therethrough. It is insulated from plate 47 by insulators 51—51, and is connected to member 41 by electrical current-carrying strap 52. Nuts 53—53 function removably to secure support member 50 in relation to plate 47 by threadedly engaging the lower portion of member 50. Member 50 is provided with a slot 54 at its upper end 55, similar to the slot provided in the lower end 39 of member 36. This slot is adapted threadedly to engage screw 56.

Supported on plate 44 is insulator 57 which supports thermocouple wire 58 which extends therethrough and thence upwardly through an insulating member 59 which insulates the thermocouple wires from plate 35 where they extend therethrough, as indicated generally at 60.

There is shown positioned in the resistor-holding device 9, a test resistor 9, each end of which is detachably secured to the resistor-holding members 36 and 50 by means of screws 40 and 56.

While only one series of elements used to support a single resistor are shown, it is to be understood that circularly spaced on plates 35, 44 and 47 are a plurality of such described supporting members.

As shown, the supporting members are positioned within tank 62.

The device is operated in the following manner. When switch 12 is closed and when switches indicated generally at 15 are closed in the upward position, current flows through the variable transformer 13 to the resistor under test. When the switches indicated generally at 15 are in the downwardly closed position, current flows through the variable transformer 13 and the step-up transformer 14 and thence to the resistor under test. Thus, it will be apparent that any voltage requirements desired may be readily obtained.

With switch 19 in the open position, switch 24 may be closed in the upper position, whereby a static measurement of resistance of a test resistor chosen by means of switches 23—23 may be obtained by use of bridge 25, in a manner well known to those skilled in the art. Following this determination, switch 24 is closed in the down position, thereby placing volt meter 26 in the circuit.

Depending upon the load desired on the particular resistor, and the approximate resistance of the particular resistor, as previously determined, a precision resistance at 16 is selected by means of switch 18. With switch 19 in the left-hand closed position, the standard resistance at 16 which has been selected will be in series with the resistor under test. Switches 20—20, in the left-hand position, will enable the volt meter 25 when switched to the particular resistor under test by means of switches 23—23, to be placed across that resistor, and thereby enable the voltage drop across it to be measured. When switches 20—20 are in the vertical position, the voltage drop across the standard resistance may be measured, and when switches 20—20 are in the right-hand position, the voltage drop across the test resistor and the standard resistance may be measured. When the desired load has been determined and the initial resistance reading has been made, switch 19 may be turned to the right-hand closed position, and the particular compensating precision resistance 17 selected by means of switch 21, equivalent to the standard resistance 16 previously selected, will be placed in series with the resistor under test.

The resistor under test will now have the same load that it had when the initial measurement of resistance was made, and the resistor may now be subjected to any desired external conditions. By merely shifting switches 22—22 and switches 23—23 to the next resistor desired to be tested, the same procedure may be followed in order to put a particular load on the test resistor, and in order to measure its resistance.

It should be obvious that by using this device a different desired load can be placed on each of the various resistors being tested, and dynamic measurements of resistance may be made.

By utilizing the supporting device shown in Fig. 2 a series of test resistors may be inserted in the resistor holders as shown, and then may be subjected to various external conditions. For instance, the tank 62 may be filled with an oil, such as silicone oil, and heated by suitable heating coils (not shown), and agitated by a suitable agitator, (also not shown). The supporting mechanism may be placed in an oven in order to simulate other external conditions, or in a container to subject the resistances under test to varying humidity conditions, or the supporting mechanism may be placed in a cold chamber to subject the resistances being tested to still further external conditions.

Of course, resistance is not actually measured, since the voltmeter merely measures the voltage drop across the particular resistances. However, since the resistor under test and either the standard resistance or the compensating precision resistance are in series, the current flowing through the resistor under test and the compensating precision resistance or the standard resistance will be the same. Since the standard resistance or the compensating precision resistance has a known resistance value, the current flowing therethrough can be calculated by means of Ohm's law. It is then a simple matter to calculate the resistance of the test resistor, since the current flowing therethrough will be the same as in the standard resistance or the compensating precision resistance and the voltage drop across the test resistor is readily ascertainable.

It should be apparent that by using the above-described device, a multiplicity of resistors can be tested, regardless of their individual resistance, wattage ratings, and physical dimensions. Such resistors can be subjected to temperature tests under rated load, either continuous or intermittent, over a very wide temperature range. Noise tests at room temperature and at elevated temperatures can be made and load-life tests can be made. Furthermore, the resistors can be subjected to various humidity tests, salt-water tests, and low-temperature tests Moreover, voltage dependency tests can be performed by cooling the medium surrounding the resistors under test and measuring the voltage drop across each resistor. During this entire testing procedure the temperature of the surface of the resistor can be recorded by means of the thermocouple.

While this invention has been described in its preferred embodiment, it is to be understood that the words used are words of description rather than limitation, and that changes within the purview of the appended claims may be made without departing from the true scope and spirit of the invention.

What is claimed is:

1. An electrical resistor testing circuit comprising a source of alternating current, transformer means and variable transformer means, switching means for alternately placing said variable transformer means or said variable transformer means and said transformer means in said circuit, whereby the voltage of said source may be varied; a plurality of standard resistances, a test resistor, switching means for placing any one of said standard resistances in series with said test resistor, a voltmeter, switching means for placing said voltmeter across any one of said standard resistances, said test resistor, or any one of said standard resistances and said test resistor; a plurality of compenating precision resistances, and switching means for placing any one of said compensating precision resistances in series with said test resistor.

2. An electrical resistor testing circuit comprising a source of alternating current, a variable transformer, a step-up transformer, three ganged double-pole double-throw switches for alternately placing said variable transformer or said variable transformer and said step-up transformer in said circuit, whereby the voltage of said source may be varied; a plurality of standard resistances, a test resistor, switching means for placing any one of said standard resistances in series with said test resistor, a voltmeter, switching means for placing said voltmeter across any one of said standard resistances, said test resistor, or any one of said standard resistances and said test resistor; a plurality of compensating precision resistances, and switching means for placing any one of said compensating precision resistances in series with said test resistor.

References Cited in the file of this patent

UNITED STATES PATENTS

| | | |
|---|---|---|
| 1,593,024 | Macadie | July 20, 1926 |
| 1,684,403 | Mason | Sept. 18, 1928 |
| 2,157,973 | Wenger | May 9, 1939 |
| 2,360,523 | Simmons | Oct. 17, 1944 |
| 2,420,055 | Sanders | May 6, 1947 |
| 2,426,246 | Skinker | Aug. 26, 1947 |
| 2,527,138 | Kohler | Oct. 24, 1950 |
| 2,593,175 | Packard et al. | Apr. 15, 1952 |